(12) United States Patent
Chung et al.

(10) Patent No.: US 9,167,084 B2
(45) Date of Patent: *Oct. 20, 2015

(54) APPARATUS AND METHOD FOR PROVIDING CALL CONNECTION NOTIFICATION TO A CALLER BY DISPLAYING PUBLIC RELATION (PR) INFORMATION OF A CALLEE

(71) Applicant: KT CORPORATION, Gyeonggi-do (KR)

(72) Inventors: Hyuk-Shik Chung, Chungcheongnam-do (KR); Sung-Hee Jeon, Chungcheongnam-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/538,207

(22) Filed: Nov. 11, 2014

(65) Prior Publication Data

US 2015/0065102 A1 Mar. 5, 2015

Related U.S. Application Data

(63) Continuation of application No. 13/226,793, filed on Sep. 7, 2011, now Pat. No. 8,913,996.

(30) Foreign Application Priority Data

Sep. 13, 2010 (KR) .................. 10-2010-0089557

(51) Int. Cl.
*H04M 3/42* (2006.01)
*H04M 3/487* (2006.01)
*H04M 3/02* (2006.01)

(52) U.S. Cl.
CPC ............ *H04M 3/42093* (2013.01); *H04M 3/02* (2013.01); *H04M 3/4878* (2013.01); *H04M 2201/38* (2013.01); *H04M 2203/654* (2013.01); *H04M 2207/18* (2013.01)

(58) Field of Classification Search
CPC .................. H04M 2201/38; H04M 2203/654; H04M 2207/18; H04M 3/4878
USPC .............. 455/412.1–415, 419–420, 461, 466, 455/550.1; 379/210.1, 211.01–211.02, 379/112.04, 45–46, 37
See application file for complete search history.

(56) References Cited

U.S. PATENT DOCUMENTS

| | | | |
|---|---|---|---|
| 6,839,424 B1 * | 1/2005 | Burnett | 379/265.02 |
| 7,792,263 B2 | 9/2010 | D'Amora et al. | |
| 8,150,003 B1 | 4/2012 | Coughlan et al. | |
| 2003/0063721 A1 * | 4/2003 | Hirose | 379/93.12 |
| 2007/0025530 A1 * | 2/2007 | Tidwell et al. | 379/88.25 |
| 2009/0313097 A1 * | 12/2009 | Chatterjee | 705/14.1 |

FOREIGN PATENT DOCUMENTS

| | | |
|---|---|---|
| KR | 10-2003-0073109 A | 9/2003 |
| KR | 10-2004-0041849 A | 5/2004 |
| KR | 10-2005-0069946 A | 7/2005 |

\* cited by examiner

*Primary Examiner* — Babar Sarwar
(74) *Attorney, Agent, or Firm* — IP Legal Services, LLC

(57) ABSTRACT

Apparatus and method for providing call connection notification. In order to provide a call connection notification service, a telephone number of a callee may be received when a caller transmits a call connection request to the callee. Based on the telephone number of the callee, public relations (PR) information may be searched for. A result of the searching may be provided to a user equipment of the caller.

11 Claims, 4 Drawing Sheets

| PR information DB(220) | | | |
|---|---|---|---|
| Identification number | Telephone number | PR image | PR sentence |
| 560412-2****** | 010-1234-5678 | null | Greatest Chicken in the town!!! Deliver to your house |
| 860127-1****** | 010-3456-7890 | link information | your honest adviser |
| 741030-2****** | 031-456-7878 | link information | null |
| ⋮ | ⋮ | ⋮ | ⋮ |

APPARATUS AND METHOD FOR PROVIDING CALL CONNECTION NOTIFICATION TO A CALLER BY DISPLAYING PUBLIC RELATION (PR) INFORMATION OF A CALLEE

CROSS REFERENCE TO PRIOR APPLICATIONS

The present application is continuation application of U.S. patent application Ser. No. 13/226,793 (filed on Sep. 7, 2011), which claims priority under 35 U.S.C. §119 to Korean Patent Application No. 10-2010-0089557 (filed on Sep. 13, 2010).

FIELD OF THE INVENTION

Apparatuses and methods consistent with the present invention relate to providing a call connection notification, and more particularly, to displaying a message indicating that a called party has responded to a call from a calling party on a screen of a user equipment of the calling party.

BACKGROUND OF THE INVENTION

In order to initiate a call, a caller dials or enters a telephone number of a callee into a user equipment such as a cell phone or a mobile phone. The caller may initiate the call by pushing a send button. Then, the caller waits until the callee responds to the call while hearing a ringback tone or a ringback music.

Hearing a ringback tone or a ringback music has been the only way to indicate to the caller whether the callee responds to a call from the caller. That is, the ringback tone or ringback music has been the only way of call connection notification. When the ringback tone or ringback music ends, this typically indicates to the caller that the callee has responded to the call. Accordingly, a caller needs to closely put a user equipment to their ear generally for several seconds or more until the callee responds to the call. Such a posture is very uncomfortable for the caller. Since a user equipment has been known to emit electromagnetic waves, a caller generally prefers not to put a user equipment close to their ear. Furthermore, a caller may have difficulty to determine whether or not a callee responds to a call when the caller is in noisy surroundings.

In order to overcome such difficulties and defects of typical call connection notification methods, Korean Patent Publication No. 2005-0069946 disclosed a method for informing a caller using a vibration, a bell sound, or a light-emitting unit when a callee responds a call initiated by the caller.

Although this method may provide a convenient and inoffensive way of call connection notification, this method has a limitation in being developed as a supplementary service and for creating profit for a service provider company.

Furthermore, a user equipment is not only a means for basic communication. The younger generation especially wants to express their personalities using their user equipment. However, a typical call connection notification method does not satisfy such a demand. Accordingly, there is a demand for developing a new call connection notification method.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, call connection may be notified using public relations (PR) information.

In accordance with another aspect of the present invention, a caller's user equipment may display PR information of a callee when a callee responds a call initiated by a caller.

In accordance with an embodiment of the present invention, in order to provide a call connection notification service, a telephone number of a callee may be received when a caller transmits a call connection request to the callee. Based on the telephone number of the callee, public relations (PR) information may be searched for. A result of the searching may be provided to a user equipment of the caller.

After the providing the result of the searching, a found PR information may be displayed on a display unit of a user equipment of the caller for a first duration of time when the callee responds to the call connection request from the caller. The result of the searching may include the found PR information.

A ringback tone may be turned off before the found PR information is displayed. The found PR information may be displayed prior to initiating a call service fee charge. The PR information may include at least one of a PR image and a PR sentence.

Prior to receiving the telephone number, at least one telephone number and corresponding PR information may be registered with a call connection notification service. The registered at least one telephone number and corresponding PR information may be stored in a database.

In order to register the at least one telephone number and corresponding PR information, at least one default image and at least one default PR sentence may be provided to a subscriber. The subscriber may register a selected default PR image of the at least one default PR image and a selected default PR sentence of the at least one default PR sentence. The registered default PR image and the registered default PR sentence may be stored as the PR information.

In order to register the at least one telephone number and corresponding PR information, at least one PR image and at least one PR sentence may be uploaded to the call connection notification service from a subscriber, and the uploaded at least one PR image and at least one PR sentences may be stored as the PR information.

A subscriber for the call connection notification service may register a telephone number and corresponding PR information through an Internet site provided by a provider of the call connection notification service, by using one of a desktop computer, a notebook computer, a user equipment, and an automatic response system (ARS).

In accordance with another embodiment of the present invention, in order to display a call connection notification message on a user equipment of a caller, a telephone number of a callee may be received from the caller. A call connection request may be transmitted from the user equipment of the caller through a mobile communication system to a user equipment of the callee and the telephone number of the callee may be transmitted to the mobile communication system. A call connection notification message may be received, from a call connection notification service server, at the user equipment of the caller when the callee responds to the call connection request. The received call connection notification message may be displayed on the user equipment of the caller for a first duration of time.

A ringback tone may be output from the user equipment of the caller after the call connection request is transmitted through the mobile communication system to the user equipment of the callee but before the received call connection notification message is displayed on the user equipment of the caller. The call connection notification message may include public relations (PR) information and the PR information may include at least one of a PR image and a PR sentence.

Prior to receiving the telephone number of the callee from the caller, the telephone number of the callee and corresponding PR information may be registered with the call connection notification service server. The callee may be a subscriber of a call notification service configured to provide the call connection notification message from the call connection notification service server.

The callee may select at least one default PR image and at least one default PR sentence, register the selected at least one default PR image and the selected at least one default PR sentence as the corresponding PR information, and store the corresponding PR information in a memory of the call connection notification service server.

The callee may upload at least one PR image and at least one PR sentence to the call connection notification service server, and the uploaded at least one PR image and the at least one PR sentence may be stored in the call connection notification service server as the corresponding PR information.

In accordance with still another embodiment of the present invention, an apparatus may provide a call connection notification message. The apparatus may include a public relations (PR) information registration unit, a PR information search unit, and a PR information provider. The PR information registration unit may be configured to register telephone numbers and corresponding PR information received from subscribers and to store the received telephone numbers and corresponding PR information in a memory. The PR information search unit may be configured to search in the memory for a PR information corresponding to a telephone number of a callee, when a call connection request having the telephone number of the callee is received from a user equipment of a caller. The PR information provider may be configured to provide the call connection notification message to the user equipment of the caller. The call connection notification message may include a result of the search for the PR information corresponding to the telephone number of the callee.

The call connection notification message may be displayed on a display unit of the user equipment of the caller after the callee responds to the call connection request from the caller. The call connection notification message may be displayed on a display unit of the user equipment of the caller prior to initiating a call service fee charge. The corresponding PR information may include at least one of a PR image and a PR sentence, and the PR information registration unit may be configured to provide at least one default PR image and at least one default PR sentence to a subscriber, register a selected default PR image of the at least one default PR image and a selected default PR sentence of the at least one default PR sentence, and store the registered default PR image and the registered default PR sentence as the corresponding PR information.

The PR information registration unit may be configured to receive a PR image and at least one PR sentence from a subscriber, register the received PR image and the received at least one PR sentence, and store the registered PR image and the registered at least one PR sentence as the corresponding PR information.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
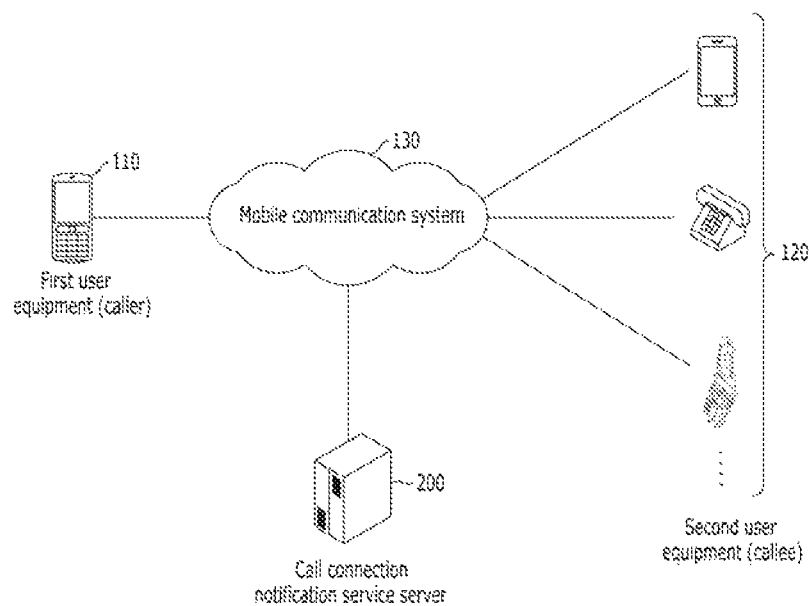
FIG. 1 illustrates a system for providing a call connection notification service, in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 illustrates a system for providing a call connection notification service, in accordance with an embodiment of the present invention.

In accordance with an embodiment of the present invention, the system may display a call connection notification message on a screen of a user equipment at a calling party when a called party responds to a call initiated from the calling party.

Referring to FIG. 1, the system may include a first user equipment 110, a second user equipment 120, a mobile communication system 130, and a call connection notification service server 200.

The first and second user equipments 110 and 120 may be representatively shown as two parties communicating with each other through a call. The first user equipment 110 may be a calling party who initiates the call, and the second user equipment 120 may be a called party who receives a call initiated from the calling party. The calling party may be referred as a caller and the called party may be referred as a callee.

The first user equipment 110 may receive a telephone number of a callee from a caller and transmit the received telephone number to the mobile communication system 130. The mobile communication system 130 may transmit a call connection request to the callee.

The first user equipment 110 may receive a ringback tone from the mobile communication system 130, such as when the call is being connected. The first user equipment 110 may output the received ringback tone for a duration of time, such as until the callee responds to the call connection request.

When the callee responds to the call connection request, such as by answering the call, the first user equipment 110 may receive Public Relations (PR) information that corresponds to the telephone number of the callee from the mobile communication system 130 and display the received PR information on the first user equipment 110.

The PR information corresponding to the telephone number of the callee may be displayed for about one or two seconds, in a call connection mode, on a screen of the first user equipment 110, but the present invention is not limited thereto.

After displaying the PR information in the call connection mode, the first user equipment transitions from the call connection mode to a conversation mode and the caller may start having a conversation with the callee.

As described above, the second user equipment 120 may be a user equipment of the callee. The second user equipment 120 may receive a call connection request from the first user equipment 110 through the mobile communication system 130 and respond to the call connection request.

The telephone number of the second user equipment 120 may be registered at the call connection notification service server 200 with corresponding PR information. When a callee at the second user equipment 120 responds to the call connection request from a caller at the first user equipment 110, the corresponding PR information may be displayed on a screen of the first user equipment 110 for the caller.

The second user equipment 120 may include at least one of a mobile communication terminal, a wired communication terminal, and an Internet-based telephone.

The mobile communication system 130 may include a mobile communication network. The mobile communication system 130 may receive a call connection request from the first user equipment 110 and transmit a call connection request to the second user equipment 120 in response to the received call connection request. The mobile communication system 130 may transmit the telephone number of the callee, such as the telephone number of the second user equipment 120, to the call connection notification service server 200.

The mobile communication system 130 may transmit a ringback tone to the first user equipment 110 for informing the caller that the callee's line is ringing.

The mobile communication system 130 may receive a call connection response from the second user equipment 120 in response to the call connection request transmitted by the first user equipment 110, and transmit the call connection response to the call connection notification service server 200.

The mobile communication system 130 may receive PR information corresponding to the telephone number of the second user equipment 120 from the call connection notification service server 200 and transmit the received PR information to the first user equipment 110.

The mobile communication system 130 may turn off or disable the ringback tone transmitted to the first user equipment 110. The mobile communication system 130 may begin charging a service fee to the caller at the first user equipment 110 after displaying the PR information of the callee on the screen of the first user equipment 110 for about one or two seconds.

The mobile communication system 130 may be coupled to a public switched telephone network or the Internet. Through the integrated network, the mobile communication system 130 may transmit a call connection request of the first user equipment 110 and receive a call connection response from the second user equipment 120 in response to the call connection request of the first user equipment 110.

In accordance with an embodiment of the present invention, the call connection notification service server 200 is described as providing a call connection notification service to the first and second user equipments 110 and 120 using the mobile communication system 130. The present invention is, however, not limited thereto. In accordance with another embodiment of the present invention, the call connection notification service server 200 may provide a call connection notification service to the first and second user equipments 110 and 120 using an Internet communication system or other network components.

The call connection notification service server 200 may receive a telephone number of a callee from the mobile communication system 130. For example, the call connection notification service server 200 may receive a telephone number of the second user equipment 120. Then, the call connection notification service server 200 may search for PR information corresponding to the received telephone number of the second user equipment 120 and transmit a result of the search to the mobile communication system 130.

The call connection notification service server 200 may register telephone numbers of subscribers for a call connection notification service and PR information corresponding to the telephone numbers. The call connection notification service server 200 may store the registered telephone numbers and the PR information thereof in a database (DB).

The telephone number of the subscriber may include at least one of a telephone number for a mobile phone, a telephone number for a wired telephone, and a telephone number for an Internet-based phone. The PR information may include at least one of a PR image and a PR sentence. The PR image may be a simple image and the PR sentence may be a sentence or a set of sentences in a text format. The PR information will be described in more detail with reference to FIG. 2.

For example, the first user equipment 110 may request a call connection to the second user equipment 120 after the telephone number of the second user equipment 120 has been registered as a subscriber for the call connection notification service at the call connection notification service server 200. In this case, the call connection notification service server 200 may receive the telephone number of the second user equipment 120 as the callee from the mobile communication system 130 and search the DB for PR information corresponding to the received telephone number.

The call connection notification service server 200 may receive a response notification message from the mobile communication system 130. The response notification message may be a message that informs a caller at the first user equipment 110 that a callee at the second user equipment 120 responds to a call connection request of the caller. In response to the response notification message, the call connection notification service server 200 may transmit the PR information of the second user equipment 120 to the mobile communication system 130.

The mobile communication system 130 may begin charging a service fee to the caller at the first user equipment 110. The PR information may be displayed on a screen of the first user equipment 110 for about one to two seconds before charging of the service fee is started.

Figure 2:
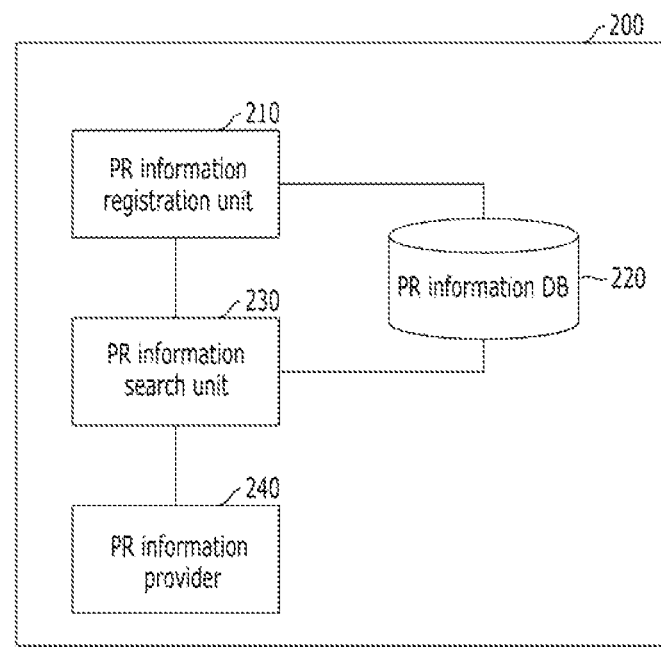
FIG. 2 illustrates a call connection notification service server in accordance with an embodiment of the present invention.

FIG. 2 illustrates a call connection notification service server 200 in accordance with an embodiment of the present invention.

In accordance with an embodiment of the present invention, the call connection notification service server 200 may provide a call connection notification service to the first and second user equipments 110 and 120. The call connection notification service may include a service for notifying a caller that a callee responds to a call by displaying PR information of the callee on a screen of a user equipment of the caller. Hereinafter, constituent elements of the call connection notification service server 200 will be described.

Referring to FIG. 2, the call connection notification service server 200 may include a PR information registration unit 210, a PR information database 220, a PR information search unit 230, and a PR information provider 240.

The PR information registration unit 210 may register telephone numbers and corresponding PR information of subscribers for a call connection notification service and map each telephone number to corresponding PR information. The PR information registration unit 210 may store the registered telephone numbers and PR information with the mapping information.

The telephone number of each subscriber may include at least one of a telephone number of a mobile phone, a telephone number of a wired telephone, and a telephone number of an Internet-based phone. The PR information may include at least one of a PR image and a PR sentence. The PR image may be a simple image, and the PR sentence may be a sentence or a set of sentences in a text format. In accordance with an embodiment of the present invention, the PR sentence may include a single sentence or a plurality of sentences and registered as PR information.

For example, a first subscriber who owns a chicken restaurant may register a telephone number of the chicken restaurant "02-1234-5678" with a PR sentence "Greatest Chicken in town!!!" as PR information.

For another example, a second subscriber who is an insurance agent may register a telephone number of a cell phone "010-3456-7890" with a picture of the second subscriber as a PR image and with a PR sentence of "your honest advisor" as PR information.

The PR information registration unit 210 may receive an image and one or more sentences directly from a subscriber as the PR image and PR sentence.

Furthermore, the PR information registration unit 210 may provide a default PR image and a default PR sentence based on a category of the subscriber. In order to provide such a default PR image and PR sentence, the PR information registration unit 210 may provide a user interface for the PR information registration.

For example, a PR image may be classified into a business category and a personal category. The business category may be further classified by a business type. For example, the business category may be classified into a restaurant business or a car care business. These classification categories are given by way of example only, and any of a number of different types of classifications may be used in addition to or in lieu of those explicitly discussed.

In the case of the car care business category, the PR information registration unit 210 may provide car images as a PR default image and enable a subscriber to select one of them and to insert a PR sentence into the selected car image. After selecting and inserting, the PR information registration unit 210 may store the selected image with the inserted sentence as the PR information.

In the case of the restaurant business category, the PR information registration unit 210 may provide PR default sentences such as "quick delivery!" and enable a subscriber to select one of the PR default sentences. After selecting, the PR information registration unit 210 may store the selected PR sentence as the PR information with the telephone number of the subscriber.

In the case of the personal category, the PR information registration unit 210 may provide emotion categories, such as happy, sad, angry, or depressed. When a subscriber select one of the emotion categories and enters a PR sentence, the PR information registration unit 210 may store the PR sentence with the selected emotion category as the PR information with the telephone number of the subscriber.

A subscriber may register the call connection notification service through a web site provided by a service provider using at least one of a desktop computer, a notebook computer, and/or a user equipment including a smart phone. Furthermore, a subscribe may use an automatic response system (ARS) to register the call connection notification service.

The PR information DB 220 may store PR information of each subscriber which has registered through the PR information registration unit 210.

The PR information DB 220 may use an identification number as a primary key to store telephone numbers and PR information thereof. For example, the identification number may be a driver's license number.

The PR sentence may be stored in a text format in the PR information DB 220. The PR image may be stored in a file format in an additional memory unit and the PR information DB 220 may store information on a link to the PR image stored in the additional memory unit.

The PR information search unit 230 may receive a telephone number of a callee from the mobile communication system and search for PR information corresponding to the received telephone number in the PR information DB 220.

Upon receipt of a response notification message from the mobile communication system 130, the PR information provider 240 may transmit the found PR information to the mobile communication system 130. As described above, the response notification message may be a message that informs a caller that a callee has responded to a call connection request of the caller.

Figure 3:
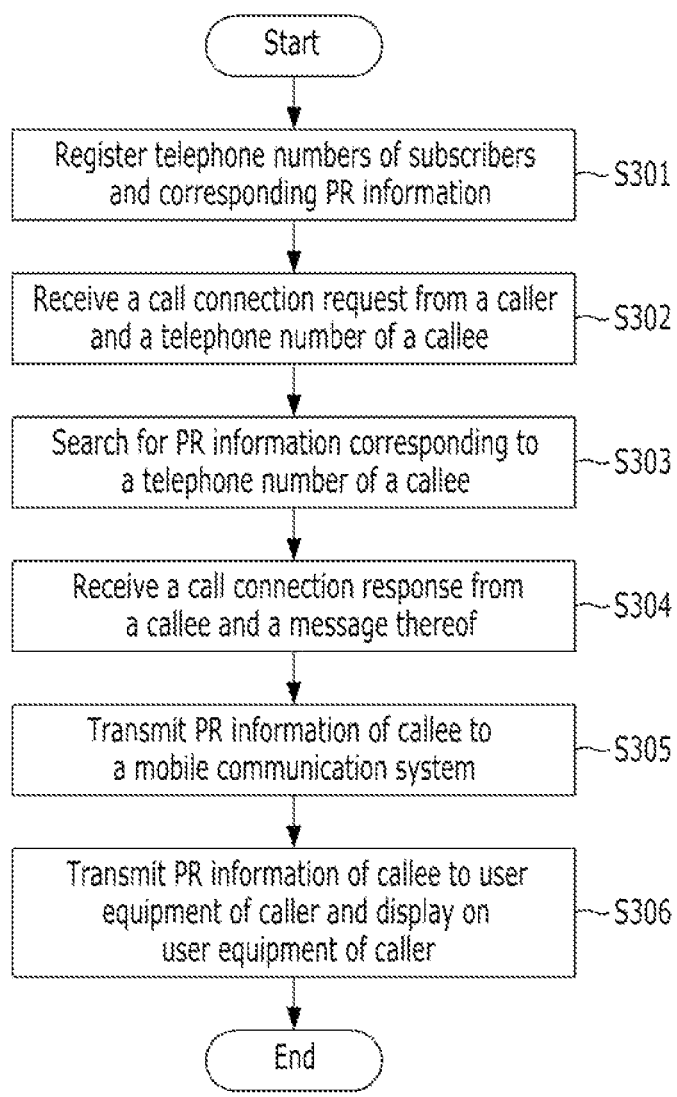
FIG. 3 illustrates a method for providing a call connection notification service, in accordance with an embodiment of the present invention.

FIG. 3 illustrates a method for providing a call connection notification, in accordance with an embodiment of the present invention.

Referring to FIG. 3, telephone numbers and corresponding PR information may be registered at the call connection notification service server 200 S301. For example, a subscribe for a call connection notification service may register a telephone number and PR information at the call connection notification service server 200. The registration of the telephone number and/or the PR information may be performed through a web site provided from a service provider. A subscriber may use any of a desktop computer, a notebook computer, and a user equipment including a mobile phone, a cell phone, or a smart phone. A subscriber may use the ARS to register a telephone number with PR information.

When a caller transmits a call connection request to the mobile communication system 130, the call connection notification service server 200 may receive a telephone number of a callee from the mobile communication system 130 S302. For example, when the caller at the first user equipment 110 wants to make a call to the callee at the second user equipment 120, the first user equipment 110 transmits a call connection request to the mobile communication system 130. In this case, the call connection notification service server 200 may receive a telephone number of the second user equipment 120 from the mobile communication system 130.

The call connection notification service server 200 may search a database for PR information corresponding to the received telephone number S303. For example, the call connection notification service server 200 may search for PR information for the second user equipment 120 from the PR information DB 220.

When the mobile communication system 130 receives a response from a callee in response to the call connection request, the call connection notification service server 200 may receive a response notification message from the mobile communication system 130 S304. The response notification message may be a message that informs a caller that a callee has responded to a call connection request of the caller. For example, when the mobile communication system 130 receives a response from the second user equipment 120 in response to the call connection request from the first user equipment 110, the call connection notification service server 200 may receive a response notification message form the mobile communication system 130.

The call connection notification service server 200 may transmit the found PR information corresponding to the telephone number of the callee to the mobile communication system 130 S305. For example, the search PR information of the second user equipment 120 may be transmitted to the mobile communication system 130.

The mobile communication system 130 may transmit the PR information of the callee to the user equipment of the caller, and the PR information of the callee may be displayed on the user equipment of the caller for about one or two seconds S306. For example, the mobile communication system 130 may transmit the PR information of the callee, the owner and/or user of the second user equipment 120, to the first user equipment 110. The first user equipment 110 may display the received PR information for about one or two seconds.

Figures 4, 5A:
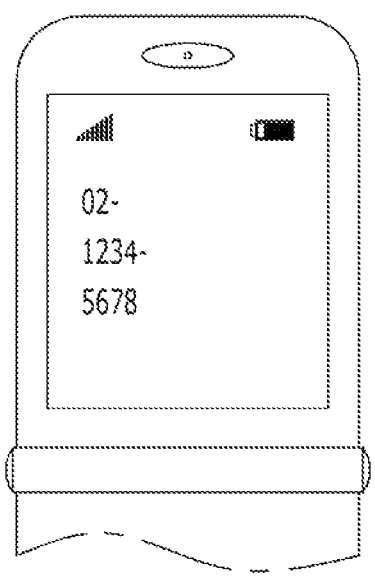
FIG. 4 illustrates a PR information database (DB) in accordance with an embodiment of the present invention.
FIGS. 5A-5C illustrate an example of providing a call connection notification service, in accordance with an embodiment of the present invention.

FIG. 4 illustrates a PR information database (DB) 220 in accordance with an embodiment of the present invention.

Referring to FIG. 4, the PR information DB 220 may include telephone numbers and PR information mapped to an identification number of each subscriber.

The PR information may include at least one of a PR image and a PR sentence. The PR image may be a simple image, and the PR sentence may be a single sentence or a set of sentences in a text format. The PR image may be stored in an additional memory, and the PR information DB 220 may only store information of a link to the additional memory.

In accordance with an embodiment of the present invention, one identification number may be mapped to a plurality of telephone numbers and associated PR information.

Figure 5B:
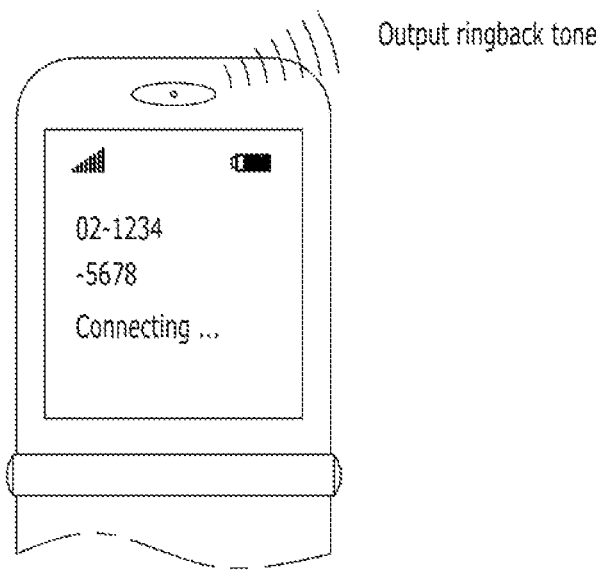
Figure 5C:
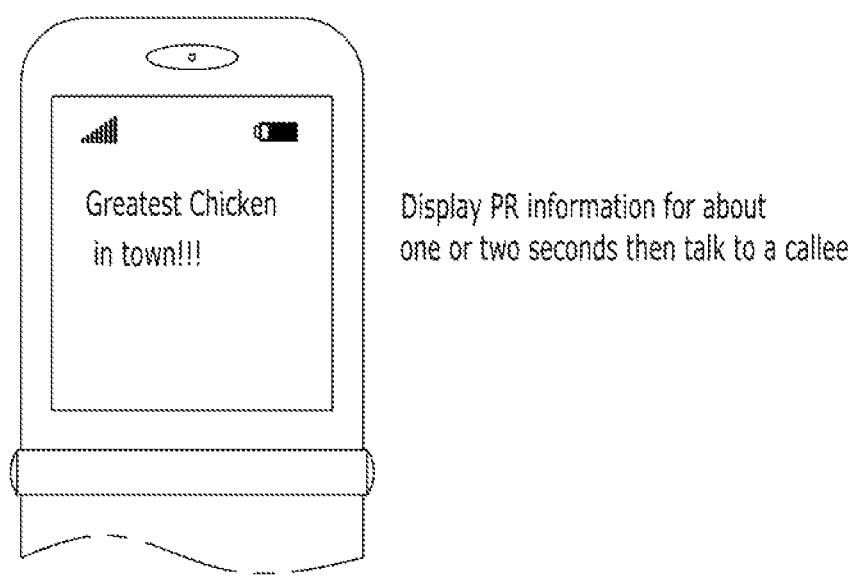

FIGS. 5A to 5C illustrate an example of displaying a call connection notification message on a user equipment, in accordance with an embodiment of the present invention.

For example, a first subscriber who runs a chicken restaurant may register a telephone number of "02-1234-5678" and a PR sentence of "Greatest Chicken in town!!!" as PR information at the call connection notification service server 200.

As shown in FIG. 5A, a customer enters the telephone number "02-1234-5678" into the user equipment and pushes a "send" button of the user equipment.

As shown in FIG. 5B, the user equipment of the customer outputs a ringback tone transmitted from the mobile communication system 130 for informing a caller that a callee's line is ringing.

When the chicken restaurant responds to the call transmitted from the customer, the mobile phone of the customer may display the PR information of the chicken restaurant on the screen for about one or two seconds. For example, "Greatest Chicken in town!!!" may be displayed on the mobile phone of the customer for about one or two seconds, as shown in FIG. 5C. When the customer sees the PR information displayed on the screen of the user equipment, the customer may now be informed that someone at the chicken restaurant has responded to the call from the customer. Then, the customer may start talking to that someone in the chicken restaurant.

A method for providing a call connection notification message in accordance with embodiments of the present invention may be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

The term "coupled" has been used throughout to mean that elements may be either directly connected together or may be coupled through one or more intervening elements.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for providing a call connection notification service, the method comprising:
   receiving a telephone number of a callee when a caller initiates a call to the callee by transmitting a call connection request to the callee;
   searching for public relations (PR) information based on the telephone number of the callee;
   providing a result of the searching to a user equipment of the caller when the callee answers the call by responding to the call connection request; and
   displaying a found PR information on a display unit of a user equipment of the caller for a first duration of time,
   wherein prior to the receiving the telephone number, the method further comprises registering at least one telephone number and corresponding PR information with a call connection notification service, and
   wherein the registering the at least one telephone number and corresponding PR information comprises providing at least one default PR image or at least one default PR sentence to a subscriber, receiving a selection for the corresponding PR information from the at least one default PR image or the at least one default PR sentence, and registering the corresponding PR information which is selected.

2. The method of claim 1, wherein
   the found PR information is displayed on the display unit of the user equipment of the caller when the callee responds to the call connection request from the caller.

3. The method of claim 1, wherein a ringback tone is turned off before the found PR information is displayed.

4. The method of claim 1, wherein the found PR information is displayed prior to initiating a call service fee charge.

5. The method of claim 1, wherein the at least one default PR image or the at least one default PR sentence are provided based on a business category or a personal category of the subscriber.

6. A method for providing a call connection notification service, the method comprising:
   receiving a telephone number of a callee when a caller initiates a call to the callee by transmitting a call connection request to the callee;
   searching for public relations (PR) information based on the telephone number of the callee;
   providing a result of the searching to a user equipment of the caller when the callee answers the call by responding to the call connection request; and
   displaying a found PR information on a display unit of a user equipment of the caller for a first duration of time, wherein prior to the receiving the telephone number, the method further comprises registering at least one telephone number and corresponding PR information with a call connection notification service, and wherein the registering the at least one telephone number and corresponding PR information comprises receiving for the corresponding PR information from a subscriber, and registering the corresponding PR information which is selected, wherein the corresponding PR information comprises at least one of PR image and PR sentence.

7. The method of claim 6, wherein
the found PR information is displayed when the callee responds to the call connection request from the caller.

8. The method of claim 6, wherein the found PR information is displayed prior to initiating a call service fee charge.

9. An apparatus for providing a call connection notification message wherein the apparatus includes at least one processor configured to perform operations for providing the call connection notification message and at least one memory configured to store data for performing operations to provide the call connection notification message and data generated during the performing operations, the apparatus comprising:
   a public relations (PR) information registration unit configured to register telephone numbers and corresponding PR information received from subscribers and to store the received telephone numbers and corresponding PR information in the at least one a memory;
   a PR information search unit configured to search in the at least one memory for a PR information corresponding to a telephone number of a callee, when a call connection request having the telephone number of the callee is received from a user equipment of a caller wherein the call connection request is generated by the user equipment of the caller when the caller initiates a call to the callee through the user equipment; and
   a PR information provider configured to provide the call connection notification message to the user equipment of a caller when the callee responds to the call connection request from the caller,
   wherein the call connection notification message is displayed on a display unit of the user equipment,
   wherein the call connection notification message comprises a result of the search for the PR information corresponding to the telephone number of the callee,
   wherein the corresponding PR information comprises at least one of a PR image and a PR sentence, and
   wherein the PR information registration unit is configured to provide at least one of default PR image and default PR sentence to a subscriber, and register at least one of a selected default PR image, a selected default PR sentence, a transmitted PR image from the subscriber and a transmitted PR sentence from the subscriber as the corresponding PR information.

10. The apparatus of claim 9, wherein the call connection notification message is displayed on a display unit of the user equipment of the caller after the callee responds to the call connection request from the caller.

11. The apparatus of claim 9, wherein the call connection notification message is displayed on a display unit of the user equipment of the caller prior to initiating a call service fee charge.

* * * * *

UNITED STATES PATENT AND TRADEMARK OFFICE
CERTIFICATE OF CORRECTION

PATENT NO. : 9,167,084 B2  
APPLICATION NO. : 14/538207  
DATED : October 20, 2015  
INVENTOR(S) : Hyuk-Shik Chung and Sung-Hee Jeon Page 1 of 1

It is certified that error appears in the above-identified patent and that said Letters Patent is hereby corrected as shown below:

In the claims

In claim 9, column 11, line 27, "at least one a memory;" should be amended --at least one memory;--.

Signed and Sealed this
First Day of March, 2016

Michelle K. Lee
*Director of the United States Patent and Trademark Office*